(12) United States Patent
Allidieres

(10) Patent No.: US 8,291,944 B2
(45) Date of Patent: Oct. 23, 2012

(54) HYDROGEN FILLING METHOD AND STATION

(75) Inventor: Laurent Allidieres, Saint Martin d'Uriage (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 578 days.

(21) Appl. No.: 12/515,029

(22) PCT Filed: Oct. 10, 2007

(86) PCT No.: PCT/FR2007/052116
§ 371 (c)(1),
(2), (4) Date: May 15, 2009

(87) PCT Pub. No.: WO2008/062117
PCT Pub. Date: May 29, 2008

(65) Prior Publication Data
US 2010/0212772 A1  Aug. 26, 2010

(30) Foreign Application Priority Data
Nov. 22, 2006  (FR) ..................................... 06 55042

(51) Int. Cl.
*B65B 1/04* (2006.01)
*B65B 31/00* (2006.01)
*F17C 7/04* (2006.01)
*F17C 13/00* (2006.01)
*B67D 7/08* (2010.01)

(52) U.S. Cl. ........... 141/60; 141/1; 141/59; 137/565.16; 137/625.2; 62/48.1; 62/50.1; 62/50.7

(58) Field of Classification Search ................ 141/1, 59, 141/60, 61, 82; 137/334, 565.01, 565.11, 137/565.16, 565.36, 625.2; 62/48.1, 49.1, 62/49.2, 50.1, 50.6, 50.7, 52.1, 53.1, 54.1
See application file for complete search history.

(56) References Cited

U.S. PATENT DOCUMENTS

| | | | | |
|---|---|---|---|---|
| 5,682,750 A * | 11/1997 | Preston et al. | ................. | 62/50.2 |
| 5,687,776 A * | 11/1997 | Forgash et al. | ................. | 141/11 |
| 5,884,488 A * | 3/1999 | Gram et al. | ................. | 62/50.6 |
| 5,954,101 A * | 9/1999 | Drube et al. | ................. | 141/82 |
| 6,354,088 B1 | 3/2002 | Emmer et al. | | |
| 6,755,219 B1 | 6/2004 | Bolle | | |
| 2003/0010399 A1 | 1/2003 | Friebe et al. | | |

FOREIGN PATENT DOCUMENTS

| | | |
|---|---|---|
| DE | 1909732 | 2/1970 |
| DE | 10311955 | 10/2003 |
| EP | 1266811 | 12/2002 |
| FR | 2011354 | 2/1970 |
| WO | 0104984 | 1/2001 |
| WO | 0144737 | 6/2001 |
| WO | 02064395 | 8/2002 |

OTHER PUBLICATIONS

Search Report for PCT/FR2007/052116.

* cited by examiner

*Primary Examiner* — Len Tran
*Assistant Examiner* — Ryan Reis
(74) *Attorney, Agent, or Firm* — Christopher J. Cronin; Justin K. Murray

(57) ABSTRACT

Hydrogen filling station, in particular, for refilling vehicle tanks with hydrogen gas, comprising a source reservoir designed to hold liquid hydrogen (LH2), a pipe for withdrawing liquid hydrogen from the source reservoir to at least one user station, an electric cryogenic pump arranged within the withdrawing pipe and an electric power supply connected to the cryogenic pump to supply the same with electricity, characterized in that the electric energy supply comprises at least one fuel cell.

21 Claims, 1 Drawing Sheet

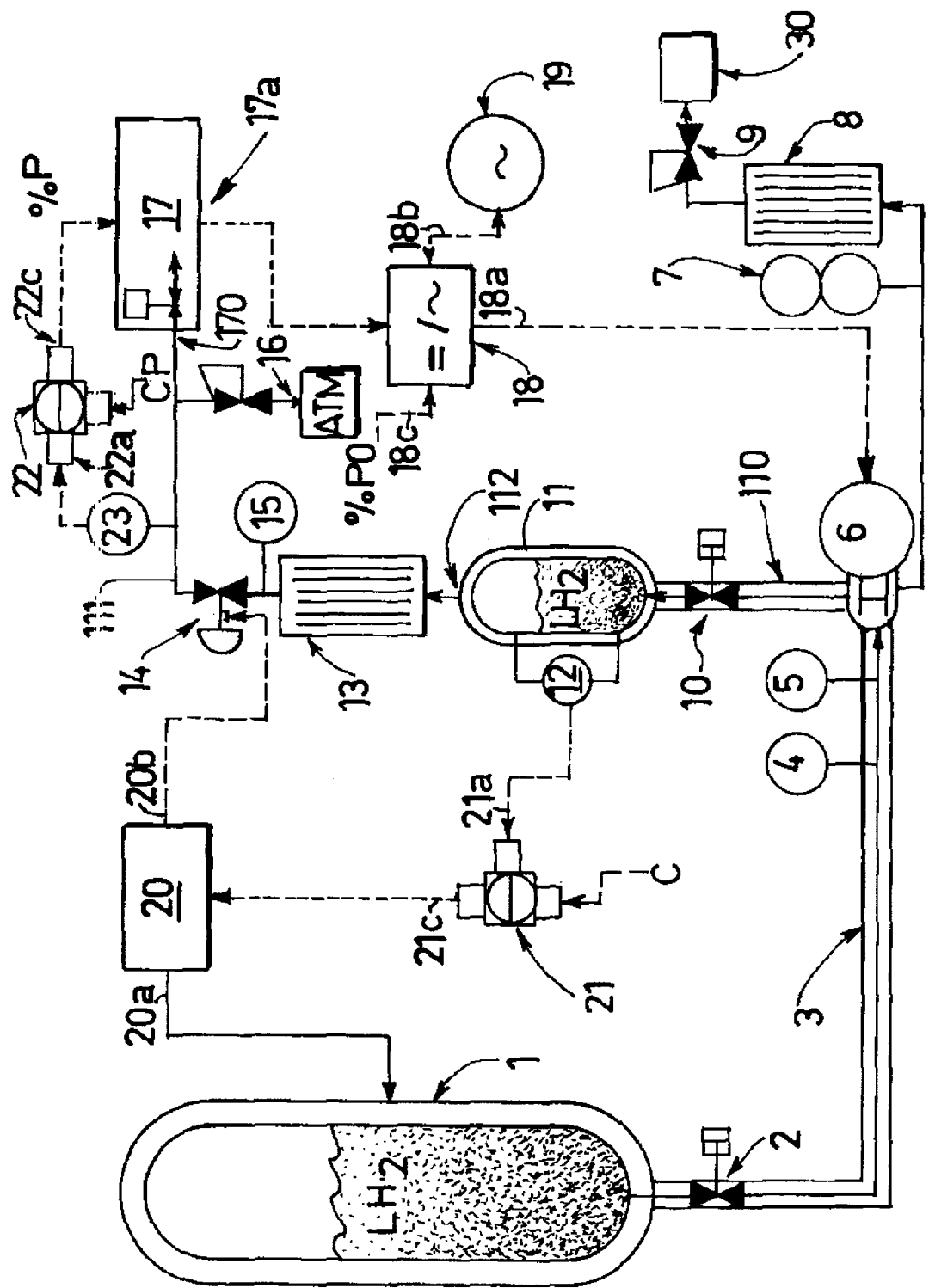

HYDROGEN FILLING METHOD AND STATION

This application is a §371 of International PCT Application PCT/FR2007/052116, filed Oct. 10, 2007.

FIELD OF THE INVENTION

The present invention relates to a hydrogen filling station and method.

The invention relates more specifically to a hydrogen filling station, particularly for refueling vehicle tanks with hydrogen gas, comprising a source tank intended to contain liquefied hydrogen, a withdrawing pipe for withdrawing the liquefied hydrogen from the source tank to at least one user station, an electric cryogenic pump positioned in the withdrawing pipe, an electric power source connected to the cryogenic pump to supply the latter with electricity.

BACKGROUND

The storage of liquefied hydrogen presents numerous advantages and, in particular, the relative ease with which liquid hydrogen can be compressed. Indeed compressing liquid hydrogen costs less in terms of compression than compressing hydrogen gas. This is notably because it is less costly in terms of energy expenditure to compress a volume of liquid than to compress a volume of gas.

Generating a high pressure using a pump for liquid hydrogen reduces the energy consumption of a refueling system by a factor of about five as compared with an equivalent system using a gas compressor.

The evaporative losses of liquid hydrogen in a cryogenic pump such as this may be substantial if the pump is not being used optimally. This liquid hydrogen is removed from the compression chamber before being pumped, so that the fluid drawn into the pumping cylinder is not a biphasic mixture which would lower the efficiency of the pump designed to pump only liquid. The evaporative hydrogen gas has therefore to be removed at relatively low pressure (intake pressure).

Because these evaporative losses are impossible to eliminate, a cryogenic pump will always generate a degassing delivery corresponding to an evaporation of cryogenic liquid within the pump housing.

This purge of hydrogen gas is mostly discharged to the atmosphere or recompressed using a gas compressor, but so doing is not satisfactory in terms of the energy balance sheet and makes the plant more complicated.

It is an object of the present invention to alleviate all or some of the abovementioned disadvantages of the prior art.

SUMMARY OF THE INVENTION

The present invention relates to a hydrogen filling station, especially a hydrogen filling station, for refueling vehicle tanks with hydrogen gas. The hydrogen filling station comprises a source tank intended to contain liquefied hydrogen (LH2), a withdrawing pipe for withdrawing the liquefied hydrogen from the source tank to at least one user station, an electric cryogenic pump positioned in the withdrawing pipe, and an electric power source connected to the cryogenic pump to supply the latter with electricity. The electric power source comprises at least one fuel cell. The station also comprises a degassing tank fluidically connected to the cryogenic pump via a degassing line in order to recover at least some of the hydrogen gas that evaporates within the pump.

BRIEF DESCRIPTION OF THE FIGURE

FIG. 1 provides a schematic which depicts the structure and operation of a hydrogen filling station according to the present invention.

DETAILED DESCRIPTION OF THE INVENTION

To this end, the hydrogen filling station according to the invention, in other respects as per the generic definition thereof given above, is essentially characterized in that the electric power source comprises at least one fuel cell.

Further, some embodiments of the invention may comprise one or more of the following features:
- the station comprises a degassing tank fluidically connected to the cryogenic pump via a degassing line in order to recover at least some of the hydrogen gas that evaporates within the pump,
- the degassing tank comprises a gas withdrawal outlet connected via a supply pipe to a fuel supply inlet of the fuel cell,
- the supply pipe comprises a heat exchanger intended to heat the gas from the degassing tank, and a control valve for controlling the gas admitted to the fuel supply inlet of the fuel cell,
- the supply pipe comprises a dump valve that discharges the gas to the atmosphere in the event of a set overpressure in the supply pipe,
- the withdrawing pipe for withdrawing liquid hydrogen from the source tank comprises, positioned downstream of the pump, a heat exchanger intended to heat up the withdrawn hydrogen, and a regulating valve,
- the station comprises a switching and regulating member for switching and regulating the electric supply power delivered to the pump, this member being connected, on the one hand, to an electric power output of the fuel cell and, on the other hand, to the electric supply input of the pump, the electric power source also comprising an electricity distributing network connected to the switching and regulating member, said switching and regulating member being designed selectively to allow the pump to be electrically powered by the network and/or the fuel cell or electrical power delivered by the fuel cell to be transferred to the network,
- the station comprises a measurement and control member for measuring and controlling the pressure within the source tank and capable of increasing or decreasing the pressure within this tank,
- the station comprises a device for measuring the level of liquid in the degassing tank, this device being connected to the member that measures and controls the pressure within the source tank, said member for measuring and controlling the pressure within the source tank also being connected to the valve that controls the gas admitted to the fuel cell, so as to control the opening/closure of this valve according to the measured level of liquid in the degassing tank,
- the source tank is situated below ground level, being, for example, buried, the pump being situated at the level of the source tank or above the latter,
- the fuel cell generates a DC current, and in that the switching and regulating member that switches and regulates the electric supply power delivered to the pump comprises an inverter capable of converting direct current into alternating current,
- the filling station also comprises a station for refueling with liquefied hydrogen from the source tank, so that supplies of hydrogen gas and/or of liquefied hydrogen can be replenished simultaneously or otherwise.

The invention also relates to a hydrogen refueling method, particularly for refueling vehicle tanks with hydrogen gas, using a filling station comprising a source tank intended to contain liquefied hydrogen (LH2), a withdrawing pipe for withdrawing liquefied hydrogen from the source tank to at least one user station, an electric cryogenic pump positioned in the withdrawing pipe, characterized in that it comprises a step in which the cryogenic pump is electrically powered via a fuel cell.

Furthermore, some embodiments of the invention may comprise one or more of the following features:
- the method comprises a step in which hydrogen gas vaporized by the pump is recirculated to supply the fuel cell with fuel,
- the hydrogen gas vaporized by the pump passes through and is stored in a buffer degassing tank situated between the pump and the fuel cell, and in that the method involves:
  - a step of measuring the level of liquid in the degassing tank,
  - a step of controlling the amount of gas admitted to supply the fuel cell according to the level of liquid measured in the degassing tank,
- when the liquid level measured in the degassing tank is above a first threshold level, the amount of gas admitted to supply the fuel cell is decreased, and when the liquid level measured in the degassing tank is below a second threshold level, the amount of gas admitted to supply the fuel cell is increased,
- the method comprises a step of measuring the liquid level in the degassing tank and a step of controlling the intake pressure of the cryogenic pump so as to maintain a set level of liquid in the degassing tank,
- the method comprises a step of increasing the intake pressure of the pump when the liquid level measured in the degassing tank is below a first set datum level and a step of decreasing the intake pressure of the pump when the liquid level measured in the degassing tank is below a second set datum level different from or equal to the first datum level,
- the excess electrical power supplied by the pump is returned to a network and/or auxiliary electrical systems such as lighting,
- when the amount of gas admitted to supply the fuel cell exceeds a first set high threshold level, the pressure in the source tank is increased in increments as long as the amount of gas admitted to supply the fuel cell does not drop back below a second high threshold level which is lower than the first high threshold level;
- when the amount of gas admitted to supply the fuel cell is below a set first low threshold level, the pressure in the source tank is decreased in decrements as long as the amount of gas admitted to supply the fuel cell does not exceed a second low threshold level which is higher than the first low threshold level.

Other particulars and advantages will become apparent from reading the description hereinafter, given with reference to the single figure which schematically depicts the structure and operation of one example of a hydrogen filling station according to the invention.

The detailed description, taken in conjunction with the accompanying figure, in which like elements are given the same or analogous reference numbers provides a further understanding of the nature and objects for the present invention.

The filling station comprises a hydrogen gas user station 30 supplied from a source tank 1 of liquefied hydrogen (LH2). The hydrogen gas is conveyed from the source tank 1 to the user station 30 via a withdrawing pipe 3 for withdrawing liquid hydrogen (insulated line under vacuum). The liquid hydrogen withdrawing pipe 3 comprises, from upstream to downstream (that is to say from the source tank 1 toward the user station 30): an isolating valve 2 (optional), temperature 4 and pressure 5 sensors (optional), a high-pressure cryogenic pump 6, a pressure sensor 7 situated on the delivery line of the pump 6, an exchanger 8 (high-pressure vaporizer) for vaporizing the liquid hydrogen into a gas and a high-pressure regulating valve 9.

The pump 6 is connected via a degassing line 110 and an isolating valve 10 (optional) to a degassing tank 11 intended to collect the biphasic mixture of liquid hydrogen and hydrogen gas that is generated by the pump 6. The cryogenic pump 6 compresses the liquid hydrogen from the source tank 1. Because, notably, of friction within the pump 6, some of the fluid is discharged at low pressure in the form of biphasic liquid via the line 110 into the degassing tank 11.

One gas outlet 112 from the degassing tank 11 is connected to the supply inlet 170 of a fuel cell 17 via a supply pipe 111.

The supply pipe 111 comprises, from upstream to downstream, a heat exchanger 13 (low-pressure vaporizer), a first pressure sensor 15, a degassing control valve 14, a second pressure sensor 23 and a divert-to-atmosphere ATM controlled by a valve 16 that acts as an overpressure safety dump valve.

A proportional integral derivative (PID) regulator 22 for controlling the power of the fuel cell 17, receives, at input:
- the hydrogen gas pressure measurement 22a taken by the second pressure sensor 23, and
- a datum CP for controlling the electric power of the fuel cell 17.

The regulator 22 at output 22c delivers a control signal for controlling the instantaneous electrical power of the fuel cell 17 (for example as a percentage % P of the nominal power of the cell that ranges between 0 and 100%).

A level sensor 12 that senses the liquid level in the degassing tank 11 is connected to a proportional integral derivative (PID) regulator that controls said level in this degassing tank 11. The level-controlling proportional integral derivative regulator 21 receives at input 21a the measured liquid level and a datum C for controlling the liquid level within the degassing tank 11.

The electric power output 17a of the fuel cell 17 is connected 18a to the electrical supply input of the pump 6 via 17a an electric power switching and regulating member 18. The electric power switching and regulating member 18 is also connected by a line 18b to an electrical network 19 and receives at input 18c a datum % PO of the intake power of the pump 6.

A device 20 for measuring and controlling the pressure in the source tank 1 (pressurizing or depressurizing line 20a) is connected to the proportional integral derivative regulator 21 that controls the level in the degassing tank 11.

More specifically, the output signal 21c from the regulator 21 that controls the level in the degassing tank 11 is transmitted to the device 20 that measures and controls the pressure in the source tank 1.

The device 20 that measures and controls the pressure in the source tank 1 may also control a degassing control valve 14 by sending it a datum opening signal 20b.

In the nominal case, the output signal 21c from the regulator 21 is, for example, the percentage (%) of opening of the degassing control valve 14.

One example of operation is described hereinafter:

The liquefied hydrogen stored at a set pressure and at a temperature lower than the corresponding saturation temperature is supplied by the source tank 1 via the insulated vacuum line 3 comprising the isolating valve 2. The high-pressure liquid hydrogen is removed by a pump 6.

The pressure of the liquid hydrogen is measured by the sensor 7, then the liquid hydrogen is heated by the exchanger 8. The high-pressure hydrogen gas is delivered via the upstream-pressure regulating valve 9. The use of the hydrogen gas, for example at pressures of the order of 700 bar, is available downstream of this valve 9.

Some of the fluid used by the pump 6 is removed at low pressure in the form of a biphasic (gas-liquid) liquid via the degassing line 110 and the valve 10 to the degassing tank 11.

The intake pressure of the pump 6 is controlled in such a way that there is always liquid present in the degassing tank 11. The degassing tank 11 is located with a head on the pump 6. That is to say that the intake bath of the pump 6 is always under an atmosphere of liquid hydrogen (essentially without any gas). That avoids any risk of cavitation in the pump 6.

The exchanger 13 downstream of the degassing tank 11 can be used to heat up the gas originating from the evaporation of liquid in the pump 6.

The degassing control valve 14 allows the hydrogen gas to be recirculated to the fuel cell 17 (which is, for example, of the PEM type).

The cell 17 therefore creates a direct current 17a which is inverted by the electric regulating and switching member 8. Depending on the power datum for the pump % PO given by the signal 18c for controlling the pump 6, the inverter 18 may possibly supplement the electric power supplied by the cell 17 with additional electric power 18b supplied by the electric network 19. Likewise, depending on the power datum for the pump % PO, the inverter 18 may possibly supply the electric network with additional power 18b produced by the fuel cell (17).

In the event of non-operation of the fuel cell 17 (because for example it is at fault or shut down), or in the event of there being excess hydrogen gas available, the valve 16 that acts as a safety dump valve may channel excess hydrogen gas to the atmosphere ATM.

The device 20 for measuring and controlling the pressure in the source tank 1 may work as follows: the measurement and control device 20 receives information from the PID regulator 21 which is aimed at controlling the liquid level in the degassing tank 11. If the liquid level is higher than the datum level C then the output signal 21c from the regulator 21 decreases. If the liquid level is below the datum level C then the output signal 21c from the regulator 21 increases. Under normal operation, the datum signal 21b for the opening of the gas control valve 14 may simply be a copy of the output signal 21c from the regulator 21.

If the output signal 21c from the regulator 21 is equal to 100% (liquid level very low requiring the gas control valve 14 to be opened wide) then the datum level (20a) for controlling the pressure in the source tank 1 is increased, for example by increments of 100 mbar every 30 seconds until the control signal 21c output by the regulator 21 falls below a lower value (for example 90%).

If the signal 21c output by the regulator 21 is equal to 0% (max liquid level and gas control valve 14 enclosed), then the datum level 20a for controlling the pressure in the source tank 1 is decreased, for example in increments of 100 mbar every 30 seconds until the signal 21c output by the regulator 21 rises above a predefined value (for example 10%).

The gas that has escaped via the control valve 14 is then collected toward the fuel cell 17. That allows the pump 6 to be powered via the electric power signal 17a, 18a. In this way, it is possible to decrease or even eliminate the contribution 18b and the dependency of the station on the electric network 19.

In the event of excess electrical power, the electricity produced by the cell 17 can be returned to the network 19 and/or to auxiliary systems of the station, such as sales outlets, lighting. This may make the filling station completely autonomous in terms of its electrical energy requirements.

Power supply management may be designed as follows: the fuel cell 17 receives, by default, all the hydrogen degassed from the degassing tank 11 and produces electricity using this recirculated hydrogen. If the amount of hydrogen degassed is too great by comparison with the nominal power P of the fuel cell then the pressure measured by the second sensor 23 increases and the vent valve 16 is opened. Likewise if the cell 17 is shut down, then the valve 16 may vent all the hydrogen degassed from the tank 11 to the atmosphere.

The electricity produced by the fuel cell 17 is sent as appropriate to the inverter of the switching and regulating member 18. Depending on:
  the current 17a received,
  the pump power % PO datum level 18c, and
  the current 18a needed to operate the pump 6 in accordance with the datum level % PO,
the switching and regulating member 18 distributes electrical current to the electric network 19 or draws current therefrom.

The source tank 1 may be situated below ground level (buried). The pump 6 may be situated above the tank, by virtue of the device 20 for measuring and controlling the pressure in the source tank 1 (which acts as a dynamic regulating block).

Thus, while at the same time being of simple and inexpensive structure, the invention presents numerous advantages over the prior art. Thus, the invention advantageously makes it possible to derive maximum benefit from the hydrogen that is vaporized inside the cryogenic pumps without requiring compression.

The transfers of power from the pump 6 to the fluid as a result of friction and the like generally range between 8 and 21% of the total power of the pump.

Simple thermodynamic calculations show that, taking the efficiencies of the motors, converters and linkages as 95% (per unit), the energy supplied by the gas that has evaporated and then been converted into electricity in a fuel cell with an output of the order of 0.6 $Nm^3$/kWh lies somewhere between 287% and 589% of the electrical power of the pump 6.

The fuel cell 17 can therefore, on the one hand, provide electricity to power the pump 6, but any excess electricity obtained can also power an electric network 19 or other users.

In this way, the hydrogen fully discharges its function of energy carrier and can make the entire filling station completely autonomous in terms of electrical energy requirements. The filling station may therefore be immune to power cuts in particular.

The invention therefore makes it possible to make skillful good use in a fuel cell of the evaporative gas losses.

What is claimed is:

1. A hydrogen filling station comprising:
   a source tank intended to contain liquefied hydrogen (LH2);
   a withdrawing pipe for withdrawing the liquefied hydrogen from the source tank to at least one user station;
   a cryogenic pump positioned in the withdrawing pipe;
   an electric power source connected to the cryogenic pump, the electric power source operable to supply the cryogenic pump with electricity, the electric power source comprising at least one fuel cell, wherein the fuel cell comprises a fuel supply inlet; and a degassing tank in fluid communication with the cryogenic pump via a degassing line such that the degassing tank is operable to recover a portion of the hydrogen that evaporates within the cryogenic pump, wherein the degassing tank comprises a gas withdrawal outlet, wherein the degassing tank is in fluid communication with the fuel cell via a supply pipe connecting the fuel supply inlet with the gas withdrawal outlet.

2. The filling station of claim 1, wherein the supply pipe comprises a heat exchanger intended to heat the gas from the degassing tank, and a control valve for controlling the gas admitted to the fuel supply inlet of the fuel cell.

3. The filling station of claim 1, wherein the supply pipe comprises a dump valve that discharges the gas to the atmosphere in the event of a set overpressure in the supply pipe.

4. The filling station of claim 1, wherein the withdrawing pipe for withdrawing liquefied hydrogen from the source tank comprises:
a heat exchanger operable to heat the withdrawn liquefied hydrogen, the heat exchanger positioned downstream of the cryogenic pump; and
a regulating valve positioned downstream of the cryogenic pump.

5. The filling station of claim 1, wherein the filling station further comprises a switching and regulating member for switching and regulating the electric supply power delivered to the cryogenic pump, the switching and regulating member being in electric communication with, an electric power output of the fuel cell and the electric supply input of the cryogenic pump, wherein the electric power source further comprises an electricity distributing network in communication with the switching and regulating member, said switching and regulating member operable to selectively provide power to the cryogenic pump using the electricity distributing network, the fuel cell or combinations thereof, wherein said switching and regulating member is also operable to send at least a portion of power produced by the fuel cell to a load, wherein the load is selected from the group consisting of the electricity distributing network, the cryogenic pump, and combinations thereof.

6. The filling station of claim 1, wherein the filling station further comprises a measurement and control member for measuring and controlling the pressure within the source tank such that the filling station is operable to adjust the pressure within the source tank.

7. The filling station of claim 6, wherein the supply pipe of the filling station comprises a dump valve operable to discharge the gas to the atmosphere in the event of a set overpressure in the supply pipe.

8. The filling station of claim 7, wherein the filling station further comprises a device for measuring the level of liquid in the degassing tank, this device being connected to the member that measures and controls the pressure within the source tank, said member for measuring and controlling the pressure within the source tank also being connected to the valve that controls the gas admitted to the fuel cell, so as to control the opening/closure of this valve according to the measured level of liquid in the degassing tank.

9. The filling station of claim 7, wherein the withdrawing pipe for withdrawing liquefied hydrogen from the source tank of the filling station comprises, a heat exchanger and a regulating valve, wherein the heat exchanger is operable to heat up the withdrawn liquefied hydrogen, wherein the heat exchanger and the regulating valve are positioned downstream of the cryogenic pump.

10. A hydrogen refueling method, using a filling station comprising a source tank intended to contain liquefied hydrogen ($LH2$), a withdrawing pipe for withdrawing liquefied hydrogen from the source tank to at least one user station, an electric cryogenic pump positioned in the withdrawing pipe, wherein the method comprises a step in which the cryogenic pump is electrically powered via a fuel cell and a step in which hydrogen gas vaporized by the cryogenic pump is recirculated to supply the fuel cell with fuel.

11. The method of claim 10, wherein the hydrogen gas vaporized by the cryogenic pump passes through and is stored in a buffer degassing tank situated between the cryogenic pump and the fuel cell, and in that the method further compromises the steps of
measuring the level of liquid in the degassing tank, and
controlling the amount of gas admitted to supply the fuel cell according to the level of liquid measured in the degassing tank.

12. The method of claim 11, wherein the liquid level measured in the degassing tank is above a first threshold level, the amount of gas admitted to supply the fuel cell is decreased, and when the liquid level measured in the degassing tank is below a second threshold level, the amount of gas admitted to supply the fuel cell is increased.

13. The method of claim 11, wherein the method further comprises the steps of measuring the liquid level in the degassing tank and controlling the intake pressure of the cryogenic pump so as to maintain a set level of liquid in the degassing tank.

14. The method of claim 13, wherein the method further comprises the steps of increasing the intake pressure of the cryogenic pump when the liquid level measured in the degassing tank is below a first set datum level and decreasing the intake pressure of the cryogenic pump when the liquid level measured in the degassing tank is below a second set datum level different from or equal to the first datum level.

15. The method of claim 12, wherein the method further comprises the steps of measuring the liquid level in the degassing tank and controlling the intake pressure of the cryogenic pump so as to maintain a set level of liquid in the degassing tank.

16. The method of claim 15, wherein the method further comprises the steps of increasing the intake pressure of the cryogenic pump when the liquid level measured in the degassing tank is below a first set datum level and a step of decreasing the intake pressure of the cryogenic pump when the liquid level measured in the degassing tank is below a second set datum level different from or equal to the first datum level.

17. A gas filling station comprising:
a source tank operable to contain liquefied hydrogen ($LH_2$);
a withdrawing pipe operable to transfer the $LH_2$ from the source tank to a user station;
a cryogenic pump in fluid communication with the withdrawing pipe, wherein the cryogenic pump is operable to pump $LH_2$ from the source tank to the user station; and
a power source operable to provide power to the cryogenic pump, the power source comprising a fuel cell, the fuel cell operable to receive hydrogen vaporized from the cryogenic pump.

18. The gas filling station of claim 17, further comprising a degassing tank in fluid communication with the cryogenic pump such that the degassing tank is operable to receive a portion of the hydrogen that evaporates from the cryogenic pump, wherein the degassing tank is in fluid communication with the fuel cell, wherein the degassing tank is downstream the cryogenic pump, and wherein the fuel cell is downstream the degassing tank.

19. The gas filling station of claim 18, further comprising a device for measuring the level of liquid in the degassing tank, said device being in communication with a member that measures and controls the pressure within the source tank, said member for measuring and controlling the pressure within the source tank also being in communication with a valve that controls the gas admitted to the fuel cell, so as to control the opening/closure of said valve according to the measured level of liquid in the degassing tank.

20. The gas filling station of claim 17, further comprising:
a switching and regulating member operable to switch and regulate the power provided to the cryogenic pump from the power source,
wherein the power source further comprises an electricity distributing network, such that the electricity distributing network is operable to provide power to the cryogenic pump, wherein said switching and regulating member is operable to selectively power the cryogenic pump using at least one of the electricity distributing network and the fuel cell.

21. The gas filling station of claim 17, further comprising:
a switching and regulating member operable to switch and regulate the power delivered to the cryogenic pump from the power source,
wherein said switching and regulating member is operable to send at least a portion of power produced by the fuel cell to a load, wherein the load is selected from the group consisting of an electricity distributing network, the cryogenic pump, and combinations thereof.

* * * * *